(12) United States Patent
Sour et al.

(10) Patent No.: US 11,214,682 B2
(45) Date of Patent: Jan. 4, 2022

(54) HEAT STABILIZED POLYAMIDE COMPOSITION

(71) Applicant: DSM IP Assets B.V., Heerlen (NL)

(72) Inventors: Wilhelmus Josephus Maria Sour, Echt (NL); Pieter Gijsman, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 15/328,633

(22) PCT Filed: Jul. 23, 2015

(86) PCT No.: PCT/EP2015/066934
§ 371 (c)(1),
(2) Date: Jan. 24, 2017

(87) PCT Pub. No.: WO2016/012563
PCT Pub. Date: Jan. 28, 2016

(65) Prior Publication Data
US 2017/0210898 A1 Jul. 27, 2017

(30) Foreign Application Priority Data
Jul. 25, 2014 (EP) .................................... 14178535

(51) Int. Cl.
| | | |
|---|---|---|
| *B29C 49/00* | (2006.01) | |
| *B60K 15/03* | (2006.01) | |
| *C08L 77/02* | (2006.01) | |
| *F17C 1/16* | (2006.01) | |
| *C08L 77/06* | (2006.01) | |
| *C08K 5/00* | (2006.01) | |
| *C08K 3/014* | (2018.01) | |
| *C08L 51/06* | (2006.01) | |
| *B29K 77/00* | (2006.01) | |
| *B29L 31/00* | (2006.01) | |

(52) U.S. Cl.
CPC .......... *C08L 77/02* (2013.01); *B29C 49/0005* (2013.01); *B60K 15/03006* (2013.01); *B60K 15/03177* (2013.01); *C08K 3/014* (2018.01); *C08K 5/005* (2013.01); *C08L 51/06* (2013.01); *C08L 77/06* (2013.01); *F17C 1/16* (2013.01); *B29K 2077/00* (2013.01); *B29K 2995/0089* (2013.01); *B29L 2031/7172* (2013.01); *B60K 2015/03032* (2013.01); *B60K 2015/03315* (2013.01); *B60K 2015/03493* (2013.01); *C08L 2201/08* (2013.01); *C08L 2205/06* (2013.01); *F17C 2201/0104* (2013.01); *F17C 2203/0619* (2013.01); *F17C 2203/0663* (2013.01); *F17C 2203/0673* (2013.01); *F17C 2203/0675* (2013.01); *F17C 2209/2127* (2013.01); *F17C 2221/012* (2013.01); *F17C 2221/033* (2013.01)

(58) Field of Classification Search
CPC .......... C08L 77/02; C08L 77/04; C08L 77/06; C08L 77/00; C08L 2666/78

USPC ......................................... 524/102, 594, 595
See application file for complete search history.

(56) References Cited

U.S. PATENT DOCUMENTS

| | | | |
|---|---|---|---|
| 4,321,336 A | 3/1982 | Meyer et al. | |
| 5,380,774 A * | 1/1995 | Mulholland | C08K 5/1345 524/120 |
| 2003/0073768 A1* | 4/2003 | Koch | C08K 5/005 524/323 |
| 2003/0162900 A1* | 8/2003 | Joachimi | C08L 77/00 525/178 |
| 2004/0242737 A1 | 12/2004 | Topulos | |
| 2006/0155066 A1* | 7/2006 | Crevecoeur | C08K 5/0041 525/178 |
| 2006/0194903 A1* | 8/2006 | Sour | C08K 3/04 524/99 |
| 2009/0280311 A1* | 11/2009 | Kumazawa | C08L 77/00 428/220 |

(Continued)

FOREIGN PATENT DOCUMENTS

| | | |
|---|---|---|
| CN | 1802416 | 7/2006 |
| CN | 102753339 | 10/2012 |

(Continued)

OTHER PUBLICATIONS

The Complete Technology Book on Industrial Polymers, Additives, Colourants, and Fillers. Asia Pacific Business Press, 2006, p. 93.*

(Continued)

*Primary Examiner* — Lee E Sanderson
(74) *Attorney, Agent, or Firm* — Nixon & Vanderhye P.C.

(57) ABSTRACT

The invention relates to a polyamide composition comprising: a. A semi-crystalline polyamide; b. An impact modifier in an amount ranging from 1 wt % to 50 wt %; c. A branching agent in an amount ranging from 0.01 to 6.0 wt %; d. An inorganic stabilizer in an amount ranging from 0.01 wt % to 2.0 wt %; e. An organic stabilizer E1 comprising a primary antioxidant group in an amount ranging from 0.01 wt % to 2.0 wt and an organic stabilizer E2 comprising a hindered amine group in an amount ranging from 0.01 wt % to 4.0 wt %; or an organic stabilizer E3 comprising a primary antioxidant group and a hindered amine group in an amount ranging from 0.02 to 6.0 wt %; or a combination of E1, E2 and E3 in a total amount of 0.02 to 6.0 wt %; wherein all wt % are based on the total amount of polyamide composition. The invention also relates to a process for preparing a container by blow molding this composition, as well as use of the container in various applications.

14 Claims, No Drawings

(56) References Cited

U.S. PATENT DOCUMENTS

| | | | | |
|---|---|---|---|---|
| 2011/0139258 A1* | 6/2011 | Doshi | ................... | B32B 27/34 |
| | | | | 137/1 |
| 2013/0281599 A1* | 10/2013 | Tomic | .............. | B60K 15/03177 |
| | | | | 524/451 |
| 2014/0171573 A1* | 6/2014 | Bayer | ................... | C08K 5/005 |
| | | | | 524/400 |

FOREIGN PATENT DOCUMENTS

| | | |
|---|---|---|
| CN | 103052685 | 4/2013 |
| WO | WO 2004/092274 | 10/2004 |
| WO | WO 2011/084423 | 7/2011 |
| WO | WO 2012/076677 | 6/2012 |

OTHER PUBLICATIONS

Puffr, Rudolf and Vladimir Kubanek, Lactam-based Polyamides: vol. II Modification, Technology, and Applications, CRC Press, Boca Raton, 1991 (Year: 1991).*
International Search Report for PCT/EP2015/066934 dated Oct. 6, 2015, 4 pages.
Written Opinion of the ISA for PCT/EP2015/066934 dated Oct. 6, 2015, 8 pages.

* cited by examiner

HEAT STABILIZED POLYAMIDE COMPOSITION

This application is the U.S. national phase of International Application No. PCT/EP2015/066934 filed Jul. 23, 2015 which designated the U.S. and claims priority to EP Patent Application No. 14178535.2 filed Jul. 25, 2014, the entire contents of each of which are hereby incorporated by reference.

This invention relates to a heat stabilized polyamide composition, as well as a process for preparing a container employing a heat stabilized polyamide composition, and also uses of the container.

Heat stabilized polyamide compositions are known and have for example been described in EP1155072. EP1155072 discloses a blow moldable thermoplastic composition which comprises a blend of a thermoplastic resin, a viscosity modifier and a weld improvement additive comprising two types of hindered phenolic oxidants. This composition exhibits good welding behavior. A drawback of this composition, however, is that the heat stability is still insufficient.

With modern applications of polyamide compositions in blow molded parts, heat stability is becoming more stringent, as modern applications have to be able to withstand heat for longer times, while retaining impact resistance at low temperatures. Moreover, there is also a need to have a broader processing window upon preparing a blow molded container. A broad processing window means that a faster preparation of a blow molded container can be achieved or blow molded containers with a higher wall thickness can be prepared or both.

There is thus a continuous need for polyamide compositions with improved heat stability, especially suitable for blow molding.

This object has been met by a polyamide composition comprising:
a. A semi-crystalline polyamide;
b. An impact modifier in an amount ranging from 1 wt % to 50 wt %;
c. A branching agent in an amount ranging from 0.01 to 6.0 wt %;
d. An inorganic stabilizer in an amount ranging from 0.01 wt % to 2.0 wt %;
e. An organic stabilizer E1 comprising a primary antioxidant group in an amount ranging from 0.01 wt % to 2.0 wt and an organic stabilizer E2 comprising a hindered amine group in an amount ranging from 0.01 wt % to 4.0 wt %; or
   an organic stabilizer E3 comprising a primary antioxidant group and a hindered amine group in an amount ranging from 0.02 to 6.0 wt %; or
   a combination of E1, E2 and E3 in a total amount of 0.02 to 6.0 wt %;
wherein all wt % are based on the total amount of polyamide composition.

The inventors have found that the composition according to the invention shows a surprising synergistic effect between the impact modifier, inorganic stabilizer and the two types of organic stabilizer with respect to the heat stability. This has been exemplified by examples. Surprisingly, the presence of an impact modifier, a combination of inorganic stabilizer and an organic stabilizer comprising a primary antioxidant group and an organic stabilizer comprising a hindered amine group provides a composition with improved heat stability, and thus allows for a broader processing window.

With the term "ranging from [number] to [number]" is meant in the context of the present invention that both numbers are included in the range and are thus expressly part of the invention.

Melt Volume Flow Rate

The melt volume flow rate (MVR) of the composition according to the invention is preferably ranging from 15 to 50 cm$^3$/10 min, as measured according to ISO 1133 with 21.6 kg and 275° C., as this facilitates blow molding the composition into a container. More preferably, the MVR is ranging from 25 to 45 cm$^3$/10 min, and most preferred ranging from 30 to 40 cm$^3$/10 min, as this is the optimum between sagging and heat increase due to friction at the die upon preparing a blow molded container.

A person skilled in the art can attain a value for the MVR by routine experiments by choosing a polyamide with a certain viscosity and the appropriate amount of branching agent. When employing a polyamide with a lower viscosity, a higher amount of branching agent is necessary and vice versa.

Polyamide

Semi-crystalline polyamides are herein to be understood as being homopolymers, copolymers, blends and grafts of synthetic long-chain polyamides having recurring amide groups in the polymer main chain as an essential constituent. Examples of polyamide homopolymers are polyamide-6 (PA 6, polycaprolactam, polycondensation of epsilon-caprolactam), polyamide-10 (PA 10, polydecanoamide), polyamide-11 (PA 11, polyundecanolactam), polyamide-12 (PA 12, polydodecanolactam), polyamide-6, 6 (PA 66, polyhexamethyleneadipamide, polycondensation product of hexamethylene diamine and adipic acid), polyamide-6,9 (PA 69, condensation product of polycondensation product of 1,6-hexamethylene diamine and azelaic acid), polyamide-4,10 (PA 410, polycondensation product of diaminobutane and 1,10-decanedioic acid), polyamide-6, 10 (PA 610, polycondensation product of 1,6-hexamethylene diamine and 1,10-decanedioic acid), polyamide-6, 12 (PA 612, polycondensation product of 1,6-hexamethylenediamine and 1,12-dodecanedioic acid), polyamide 10,10 (PA 1010, polycondensation product of 1,10-decamethylenediamine and 1,10-decanedicarboxylic acid), PA 1012 (polycondensation product of 1,10-decamethylenediamine and dodecanedicarboxylic acid) or PA 1212 (polycondensation product of 1,12-dodecamethylenediamine and dodecanedicarboxylic acid).

Polyamide copolymers may comprise the polyamide building blocks in various ratios. Examples of polyamide copolymers are polyamide 6/66 and polyamide 66/6 (PA 6/66, PA 66/6, copolyamides made from PA 6 and PA 66 building blocks, i.e. made from epsilon caprolactam, hexamethylenediamine and adipic acid). PA 66/6 (90/10) may contain 90 percent of PA 66 and 10 percent of PA 6. Further examples are polyamide 66/610 (PA 66/610, made from hexamethylenediamine, adipic acid and sebacic acid). Polyamide copolymers may also comprise cyclic building blocks including aromatic building blocks, such as isophorone diamine, terephtalic acid, isophtalic acid, such as for example PA 6/IPDT and PA 6I/6T. Preferably, the polyamide copolymers comprise cyclic building blocks in an amount less than building blocks of chosen from the group of epsilon-caprolactam, hexamethylene diamine, adipic acid and combinations thereof.

Preferably, the semi-crystalline polyamides have as main building blocks epsilon-caprolactam and/or building blocks hexamethylene diamine and adipic acid, including PA-6, PA-66, PA6/66 and PA66/6 and blends thereof.

The semi-crystalline polyamide is present in an amount preferably ranging from 50 to 98.97 wt %, more preferably in an amount ranging from 60 to 80 wt %, most preferred in an amount ranging from 70 to 80 wt %.

Impact Modifier

Suitable impact modifiers are rubber-like polymers that not only contain apolar monomers such as olefins, but also polar or reactive monomers such as, among others, acrylates and epoxide, acid or anhydride containing monomers. Examples include a copolymer of ethylene with (meth) acrylic acid or an ethylene/propylene copolymer functionalized with anhydride groups. The advantage of impact modifiers is that they do not only improve the impact strength of the composition but also contribute to less sagging.

A survey of impact modifiers can be found e.g. in Nylon Plastics Handbook, 1995 edition, page 414 ff. and the citations mentioned therein. Preferred impact modifiers are rubbers containing apolar monomers such as olefins, and also polar or reactive monomers such as, among others, acrylates, epoxide, acid or anhydride containing monomers. Examples include a copolymer of ethylene with (meth) acrylic acid or an ethylene/propylene copolymer functionalized with anhydride groups.

With rubber is herein meant a flexible rubber with a low modulus and a glass transition temperature lower than 0° C., preferably lower than −25° C., more preferably lower than −40° C., and most preferred lower than −50° C. Examples of polymers falling under this definition are copolymers of ethylene and α-olefins, for example propene and butene. Also plastomers, being copolymers of for example ethylene and 1-octene, that can be obtained by polymerization in the presence of a metallocene catalyst, are suitable as component of the rubber mixture.

As used herein, a functionalized rubber is a rubber containing groups being reactive with polyamide. Such functionalized rubbers are known. For example U.S. Pat. No. 4,174,358 describes a large number of suitable functionalized rubbers as well as the methods for preparing such functionalized rubbers. Highly suitable are olefinic rubbers that are chemically modified by reaction with maleic anhydride or copolymers of the rubber with a unsaturated dicarboxylic acid, anhydride and/or esters thereof, for example maleic acid anhydride, itaconic acid and itaconic acid anhydride, fumaric acid and ester of maleic acid and glycidyl acrylate for example glycidylmethacrylate. In such cases the polyamide preferably contains sufficient amino-end groups which can react with the functional groups. The functionalized ethylene-α-olefin copolymer is in case of a polyamide-6 preferably functionalized with maleic acid anhydride. The maleic acid anhydride content of the functionalized rubber may vary within wide limits, for example ranging from 0.1 to 10 wt. %, preferably ranging from 0.1 to 5 wt. %, more preferably ranging from 0.1 to 2 wt. %.

The amount of impact modifiers is at least 1 wt % with respect to the total amount of the composition, preferably at least 5 wt %, more preferably at least 7.5 wt % and most preferred at least 10 wt %. This has the advantage that the impact strength is good.

The amount of impact modifiers is at most 50 wt % with respect to the total amount of the composition, preferably at most 40 wt %, and even more preferred at most 30 wt %. This has the advantage that the barrier properties remain sufficient. Preferably, the impact modifier is a maleic anhydride functionalized polyolefin.

Inorganic Stabilizer

The composition according to the invention contains an inorganic stabilizer in an amount ranging from 0.01 wt % to 2.0 wt %, preferably ranging from 0.1 wt % to 1.0 wt %. Inorganic stabilizers are known and are for example a copper compound and a salt containing a halogenide acid group, for example an iodide or a bromide salt. Good examples of suitable copper compounds include copper (I) halogenides, preferably copper iodide (CuI) and further copper salts like for instance copper acetate, copper sulfate and cupper stearate. As the salt containing an halogenide acid group preferably potassium bromide (KBr) of potassium iodide (KI) are used. Most preferred a combination of copper iodide and potassium bromide (CuI/KBr) is used. The copper compound and the salt suitably are present in the composition according to the invention in a molar ratio of Cu:halogenide of between 1:5 to 1:30. The amount of Cu preferably is between 10-500 ppm, based on the total of the composition, more preferably between 1-100 ppm, even more preferably 10-70 ppm. In this way the composition has for many applications an adequate level of thermal stability, while, due to the relatively low level of copper, it does not show or it shows at least to a lesser extend the disadvantages of the presence of the copper compound. These disadvantages include for instance discoloration under humid conditions or loss in electric properties.

Also suitable are copper complexes, for instance mentioned in WO 00/22035. Examples of the complexes include copper complexes having as complex ligand triphenylphosphine (commercially known as for example Bruggolen H3387), mercaptobenzimidazole, EDTA, acetylacetonate, glycine, ethylene diamine, oxalate, diethylene triamine, triethylene tetramine, pyridine, diphosphone and dipyridyl. Preferred are triphenylphosphine, mercaptobenzimidazole, acetylacetonate and glycine.

Organic Stabilizers

The polyamide composition according to the invention comprises an organic stabilizer E1 comprising a primary antioxidant group in an amount ranging from 0.01 wt % to 2.0 wt % and an organic stabilizer E2 comprising a hindered amine group in an amount ranging from 0.01 wt % to 4.0 wt %; or an organic stabilizer E3 comprising a primary antioxidant group and a hindered amine group in an amount ranging from 0.02 to 6.0 wt %; or a combination of E1, E2 and E3, in a total amount ranging from 0.02 to 6.0 wt %, in which the weight percentages are based on the total amount of composition.

Combination of E1, E2 and E3 is herein understood to include combinations E1+E3, E2+E3, as well as E1+E2+E3.

An organic stabilizer comprising a primary antioxidant group is also referred to as E1, an organic stabilizer comprising a hindered amine group is also referred to as E2. An organic stabilizer comprising both a primary antioxidant group and a hindered amine group is also referred to as E3.

Preferably, the composition comprises E1 in an amount ranging from 0.1 wt % to 1.0 wt % and E2 in an amount ranging from 0.1 wt % to 2.0 wt % or E3 in an amount ranging from 0.2 to 3.0 wt %, or a combination of E1, E2 and E3 in a total amount ranging from 0.2 to 3.0 wt %, based on the total amount of composition The ratio of primary antioxidant group:hindered amine group is preferably at least 1:1, more preferred the ratio is at least 1:1.5, even more preferred the ratio is at least 1:1.7, in which the ratio is based on weight percentages if the groups are present as E1 and E2; if the primary antioxidant group and the hindered amine group are present as E3 or a combination of E1, E2, and E3, the ratio is calculated by the number of primary antioxidant group:number of hindered amine group. A primary antioxidant group is known in the art as such and includes for example a hindered phenol or an aromatic amine. A hindered amine group is also known in the art as such.

The primary antioxidant group and hindered amine group may be present in one organic stabilizer in the amounts as indicated above and referred to as E3, such as for example known as Bis(1,2,2,6,6-pentamethyl-4-piperidinyl)(3,5-di-t-butyl-4-hydroxybenzyl)-butylpropanedioate (Tinuvin® 144), or 1-[2-{3-(3,5-di-t-butyl-4-hydroxy)-propionyloxy}ethyl]-4-[3-{3,5-di-t-butyl-4-hydroxyphenyl}propionyloxy]-2,2,6,6-tetramethylpiperidine (Sanol® LS2626).

Primary Antioxidants

Organic stabilizers comprising a primary antioxidant group E1 are radical scavengers such as for example phenolic antioxidants as well as aromatic amines, and are known as such.

The composition according to the invention may comprise secondary antioxidants, such as phosphites and thioesters. However, preferably the composition is free of phosphites as upon preparing the composition and during blow molding the presence of phosphites negatively influences the viscosity stability.

Examples of organic stabilizers comprising a primary antioxidant group being a phenolic antioxidant are:
Benzenepropanoic acid, 3,5-bis(1,1-dimethylethyl)-4-hydroxy-octadecyl ester
2-Propyleneacid, 2-isopentane 6[(3-isopentane-2-hydroxy-5-isopentane-phenyl)-ethyl]-4-isopentanephenylester
2-Propenoic acid, 2-(1,1-dimethylethyl)-6-[[3-1,1-dimethylethyl)-2-hydroxy-5-methylphenyl]methyl]-4-methylphenylester
Di-ethyl-ester of 3,5-di-t-butyl-4-hydroxy-benzyl-phosphoric acid
2,5,7,8-Tetra-methyl-2-(4',8',12'-tri-methyl-tri-decyl)-chroman-6-ol
Benzenepropanoic acid, 3,5-bis(1,1-dimethylethyl)-4-hydroxy-, isooctyl ester
Benzenepropionic acid, 3,5-bis (1,1-dimethylethyl)-4-hydroxy, isotridecyl ester
Benzenepropanoic acid, 3,5-bis(1,1-dimethylethyl)-4-hydroxy-$C_{13-15}$ branched and linear alkyl esters
2,2'-Methylenebis (6-t-butyl-4-methylphenol)
2,2'-Methylenebis (4-ethyl-6-t-butylphenol)
2,2'-Methylenebis 6-(1-methylcyclohexyl)-p-cresol
4,4'-Butylidenebis (6-t-butyl-3-methyl-phenol)
2,2'-Ethylidenebis (4,6-di-t-butylphenol)
Phenol, 4,4'-methylenebis[2,6-bis(1,1-dimethylethyl)-
2,2'-Isobutylidenebis (4,6-dimethylphenol)
N,N'—Hexamethylene bis (3,5-di-t-butyl-4-hydroxyhydrocinnamamide)
3,9-Bis(1,1-dimethyl-2-(β-(3-t-butyl-4-hydroxy-5-methylphenyl)-propyonyl-oxy)-ethyl)-2,4,8,10-tetraoxospiro
Ethylenebis (oxyethylene) bis (3-t-butyl-4-hydroxy-5-methylhydrocinnamate)
Hexamethylenebis (3,5-di-t-butyl-4-hydroxycinnamate)
Benzenepropanamide, N,N'-1,3-propanediylbis[3,5-bis(1,1-dimethylethyl)-4-hydroxy-]
Calcium bis[monoethyl(3,5-di-t-butyl-4-hydroxybenzyl) phosphonate]
Phenol, 2,2'-methylenebis[4-methyl-6-nonyl-]
1,1,3-Tris(2-methyl-4-hydroxy-5-t-butyl phenyl)butane
Phenol, 4,4'4'''-[(2,4,6-trimethyl-1,3,5-benzenetriyl)-tris-(methylene)]-tris-2,6-bis(1,1-dimethylethyl)-
Bis-[3,3-bis-(4'-hydroxy-3'-t-butylphenyl butanoic acid]-glycol ester
Tris(3,5-di-t-butyl-4-hydroxy benzyl) isocyanurate
1,3,5-Tris (4-t-butyl-3-hydroxy-2,6-dimethylbenzyl)-1,3,5-triazine-2,4,6-(1H,3H,5H)-trione
3-(3,5-Di-t-butyl-4-hydroxy-phenyl) propion acid ester with 1,3,5-tris (2-hydroxy-ethyl)-iso-cyanurate
Tetrakis [methylene (3,5-di-t-butyl-4-hydroxyhydrocinnamate)] methane
p-Cresol/dicyclopentadiene butylated reaction product
1,1,3-tris[2-methyl-4-[3-(3,5-di-tert-butyl-4-hydroxyphenyl)propionyloxy]-5-tert-butylphenyl]butane Preferred are:
Benzenepropanoic acid, 3,5-bis(1,1-dimethylethyl)-4-hydroxy-octadecyl ester
2,5,7,8-Tetra-methyl-2-(4',8',12'-tri-methyl-tri-decyl)-chroman-6-ol
Benzenepropanoic acid, 3,5-bis(1,1-dimethylethyl)-4-hydroxy-, isooctyl ester
Benzenepropionic acid, 3,5-bis (1,1-dimethylethyl)-4-hydroxy, isotridecyl ester
Benzenepropanoic acid, 3,5-bis(1,1-dimethylethyl)-4-hydroxy-$C_{13-15}$ branched and linear alkyl esters
2,2'-Methylenebis (6-t-butyl-4-methylphenol)
N,N'—Hexamethylene bis (3,5-di-t-butyl-4-hydroxyhydrocinnamamide)
Ethylenebis (oxyethylene) bis (3-t-butyl-4-hydroxy-5-methylhydrocinnamate)
Hexamethylenebis (3,5-di-t-butyl-4-hydroxycinnamate)
1,1,3-Tris(2-methyl-4-hydroxy-5-t-butyl phenyl)butane
Phenol, 4,4'4'''-[(2,4,6-trimethyl-1,3,5-benzenetriyl)-tris-(methylene)]-tris-2,6-bis(1,1-dimethylethyl)-
Bis-[3,3-bis-(4'-hydroxy-3'-t-butylphenyl butanoic acid]-glycol ester
Tris(3,5-di-t-butyl-4-hydroxy benzyl) isocyanurate
3-(3,5-Di-t-butyl-4-hydroxy-phenyl) propion acid ester with 1,3,5-tris (2-hydroxy-ethyl)-iso-cyanurate
Tetrakis [methylene (3,5-di-t-butyl-4-hydroxyhydrocinnamate)] methane Most preferred are:
Benzenepropanoic acid, 3,5-bis(1,1-dimethylethyl)-4-hydroxy-octadecyl ester
2,5,7,8-Tetra-methyl-2-(4',8',12'-tri-methyl-tri-decyl)-chroman-6-ol
N,N'—Hexamethylene bis (3,5-di-t-butyl-4-hydroxyhydrocinnamamide)
Ethylenebis (oxyethylene) bis (3-t-butyl-4-hydroxy-5-methylhydrocinnamate)
Hexamethylenebis (3,5-di-t-butyl-4-hydroxycinnamate)
Phenol, 4,4'4'''-[(2,4,6-trimethyl-1,3,5-benzenetriyl)-tris-(methylene)]-tris-2,6-bis(1,1-dimethylethyl)-
Bis-[3,3-bis-(4'-hydroxy-3'-t-butylphenyl butanoic acid]-glycol ester
Tris(3,5-di-t-butyl-4-hydroxy benzyl) isocyanurate
Tetrakis [methylene (3,5-di-t-butyl-4-hydroxyhydrocinnamate)] methane
3-(3,5-Di-t-butyl-4-hydroxy-phenyl) propion acid ester with 1,3,5-tris (2-hydroxy-ethyl)-iso-cyanurate.

Examples of organic stabilizers comprising a primary antioxidant group being an aromatic amine are:
4,4'-Di-cumyl-di-phenyl-amine
N,N'-Diphenyl-p-phenylenediamine
2,2,4-Trimethyl-1,2-dihydroquinoline polymer
4,4'-Dioctyl-diphenyl-amine
1,4-Benzenediamine, N,N'-bis(1-methylpropyl)
N-Isopropyl-N'-phenyl-paraphenylenediamine
N-1,3-dimethyl-butyl-N'-phenyl-paraphenylene-diamine
N,N'-Bis (1,4-dimethylpentyl)-p-phenylenediamine
2-Naphthalenamine, N-phenyl- 1,4-Benzenediamine, N-(1-methylethyl)-N'-phenyl-
Benzenamine, N-phenyl-,reaction product with 2,4,4 trimethyl pentane
1,4-Benzenediamine, N,N'-bis[4-(1-phenylethyl)phenyl]—
p-(p-Toluene-sulfonylamido)-diphenylamine
Benzeneamine, N-{4-[(1,3-dimethylbutyl)imino]-2,5-cyclohexadien-1-ylidine
N-phenyl-N'-1-phenylethyl-1,4-phenylenediamine
reaction product of diphenyl amine and acetone
Mixture of styrenated diphenylamines
Phenyl-α-naphtylamine
Nonylated diphenylamine
A blend of reaction products of: N-(1,3-dimethylbutyl)-N'-phenyl-p-phenylenediamine and N-(4-[α,α'dimethylbenzyl]phenyl)-N'-(1,3-dimethylbutyl) p-phenylendiamine
Blend of alkyl-aryl-p-phenylenediamines
Blend of alkyl-aryl- and dialkyl-p-phenylenediamines
1,2-Dihydro-2,2,4-trimethylquinolene
1,4-benzenediamine-N—(α-methylbenzyl)-N'-phenyl
Preferred are:
4,4'-Di-cumyl-di-phenyl-amine
N,N'-Diphenyl-p-phenylenediamine
2,2,4-Trimethyl-1,2-dihydroquinoline polymer
4,4'-Dioctyl-diphenyl-amine
1,4-Benzenediamine, N,N'-bis(1-methylpropyl)
N-Isopropyl-N'-phenyl-paraphenylenediamine
N-1,3-dimethyl-butyl-N'-phenyl-paraphenylene-diamine
N,N'-Bis (1,4-dimethylpentyl)-p-phenylenediamine
Benzenamine, N-phenyl-,reaction product with 2,4,4 trimethyl pentane
Most preferred is:
4,4'-Di-cumyl-di-phenyl-amine.
Examples of organic stabilizers containing a primary antioxidant group and a secondary antioxidant group are:
4,4'-Thio-bis-(2-t-butyl-5-methyl-phenol)
2,4-Bis-octyl-mercapto-6-(4-hydroxy-3,5-di-t-butyl-anilo)-1,3,5-triazine
2,2'-Thio-ethanol-bis-3-(3,5-di-t-butyl-4-hydroxy-phenyl)-propionate
Phenol, 2,2'-Thiobis[6-(1,1-dimethylethyl)-4-methyl-]
Phenol, 4,4'-thiobis[2-(1,1-dimethylethyl)-6-methyl]—
Phenol,2-methyl-4,6-bis[(octylthio)methyl]—
4,6-bis-(dodecylthiomethyl)-O-cresol
6-[3-(3-t-Butyl-4-hydroxy-5-methyl)propoxy]-2,4,8,10-tetra-t-butyldibenz[d,f][1,3,2]-dioxaphosphepin
Phenol, 4,4'-thiobis 2-(1,1-dimethylethyl) phosphite
Tris-(2-t-butyl-4-thio-(2'-methyl-4'-hydroxy-5'-t-butyl)phenyl-5-methyl]phenyl phosphite
Preferred are:
4,4'-Thio-bis-(2-t-butyl-5-methyl-phenol)
2,4-Bis-octyl-mercapto-6-(4-hydroxy-3,5-di-t-butyl-anilo)-1,3,5-triazine
2,2'-Thio-ethanol-bis-3-(3,5-di-t-butyl-4-hydroxy-phenyl)-propionate
Phenol,2-methyl-4,6-bis[(octylthio)methyl]-4,6-bis-(dodecylthiomethyl)-O-cresol
Most preferred are:
2,4-Bis-octyl-mercapto-6-(4-hydroxy-3,5-di-t-butyl-anilo)-1,3,5-triazine
2,2'-Thio-ethanol-bis-3-(3,5-di-t-butyl-4-hydroxy-phenyl)-propionate
Phenol,2-methyl-4,6-bis[(octylthio)methyl]-4,6-bis-(dodecylthiomethyl)-O-cresol
Preferably, the composition according to the invention comprises an organic stabilizer comprising a primary antioxidant group being a phenolic antioxidant, as phenolic antioxidants exhibit less discoloration compared to aromatic amines.

Hindered Amine Group

Suitable organic stabilisers E2 comprising a hindered amine (also known as Hindered Amine Stablizer; HAS) in the composition according to the invention are for example HAS compounds derived from a substituted piperidine compound, in particular any compound which is derived from an alkyl-substituted piperidinyl or piperazinone compound, and substituted alkoxy peridinyl compounds. Hindered amines according to the definition in this disclosure do not comprise aromatic amines, as these are considered to belong to the class of primary antioxidant.

Preferred HAS compounds include those of the following general formulas or combinations thereof;

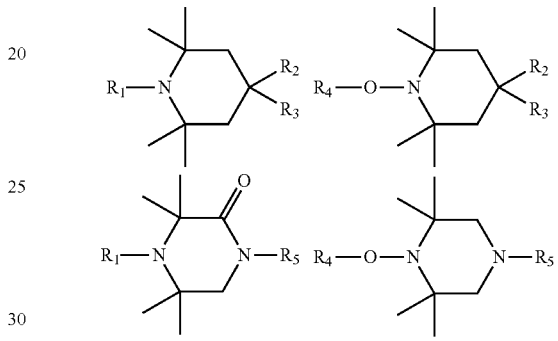

wherein $R_1$ up to and including $R_5$ are independent substituents; for example containing hydrogen, ether, ester, amine, amide, alkyl, alkenyl, alkynyl, aralkyl, cycloalkyl and/or aryl groups, which substituents may in turn contain functional groups, for example alcohols, ketones, anhydrides, imines, siloxanes, ethers, carboxyl groups, aldehydes, esters, amides, imides, amines, nitriles, ethers, urethanes and any combination thereof.

Examples of suitable organic stabilizers E2 comprising a hindered amine are:
2,2,6,6-tetramethyl-4-piperidinone
2,2,6,6-tetramethyl-4-piperidinol
bis-(2,2,6,6-tetramethyl-4-piperidinyl)-sebacate (Tinuvin® 770)
mixtures of esters of 2,2,6,6-tetramethyl-4-piperidinol and fatty acids (Cyasorb® UV 3853)
bis-(2,2,6,6-tetramethyl-4-piperidinyl)-succinate (Tinuvin® 780)
bis-(1-octyloxy-2,2,6,6-tetramethyl-4-piperidinyl)-sebacate (Tinuvin® 123)
bis-(1,2,2,6,6-pentamethyl-4-piperidinyl)-sebacate (Tinuvin® 765)
tetrakis-(2,2,6,6-tetramethyl-4-piperidyl)-1,2,3,4-butane-tetracarboxylate
N-butyl-2,2,6,6-tetramethyl-4-piperidinamine
N,N'-bis-(2,2,6,6-tetramethyl-4-piperidyl)-hexane-1,6-diamine
2.2'-[(2.2.6.6-tetramethyl-4-piperidinyl)-imino]-bis-[ethanol]
5-(2.2.6.6-tetramethyl-4-piperidinyl)-2-cyclo-undecyl-oxazole) (Hostavin® N20)
mixture of: 2,2,4,4 tetramethyl-21-oxo-7-oxa-3.20-diazadispiro[5.1.11.2] heneicosane-20-propionic acid dodecylester and 2.2.4.4 tetramethyl-21-oxo-7; oxa-3,20-diazadispiro[5,1,11,2]-heneicosane-20-propionic acid; tetradecyl ester (Hostavin® N24)

Diacetam® 5 (CAS registration number: 76505-58-3)

propanedioic acid, [(4-methoxyphenyl)methylene]—,bis(1,2,2,6,6-pentamethyl-4-piperidinyl) ester (Sanduvor® PR 31)

1,3-benzendicarboxamide,N,N'-bis(2,2,6,6-tetramethyl-4-piperidinyl) (Nylostab® S-EED)

3-dodecyl-1-(2,2,6,6-tetramethyl-4-piperidyl)-pyrrolidin-2,5-dione (Cyasorb® UV3581)

formamide, N,N'-1,6-hexanediylbis[N-(2,2,6,6-tetramethyl-4-piperidinyl (Uvinul® 4050H)

3-dodecyl-1-(1,2,2,6,6-pentamethyl-4-piperidyl)-pyrrolidin-2,5-dione (Cyasorb® UV-3641)

1,5-Dioxaspiro (5,5) undecane 3,3-dicarboxylic acid, bis (2,2,6,6-tetramethyl-4-peridinyl) ester (Cyasorb® UV-500)

1,5-Dioxaspiro (5,5) undecane 3,3-dicarboxylic acid, bis (1,2,2,6,6-pentamethyl-4-peridinyl) ester (Cyasorb® UV-516)

bis(1,2,2,6,6-pentamethyl-4-piperidinyl)(3,5-di-t-butyl-4-hydroxybenzyl)-butylpropanedioate (Tinuvin® 144)

tetrakis-(1,2,2,6,6-penta-methyl-4-piperidyl)-1,2,3,4-butane-tetra-carboxylate (ADK STAB LA-52)

1,2,3,4-butanetetracarboxylic acid, tetrakis(2,2,6,6-tetramethyl-4-piperidinyl)ester (ADK STAB LA-57)

1,2,3,4-butane-tetracarboxylic acid-1,2,3-tris(1,2,2,6,6-pentamethyl-4-piperidinyl)-4-tridecylester (ADK STAB LA-62)

8-acetyl-3-dodecyl-7,7,9,9-tetramethyl-1,3,8-triazaspiro(4,5)decane-2,4-dione (Tinuvin® 440)

N-2,2,6,6-tetrametyl-4-piperidinyl-N-amino-oxamide (Luchem® HAR100)

4-acryloyloxy-1,2,2,6,6-pentamethyl-4-piperidine 1,5,8,12-tetrakis[2',4'-bis(1",2",2",6",6"-pentamethyl-4"-piperidinyl(butyl)amino)-1',3',5'-triazin-6'-yl]-1,5,8,12-tetraazadodecane -1,1'-(1,2-ethane-di-yl)-bis-(3,3',5,5'-tetra-methyl-piperazinone) (Goodrite® 3034)

propane amide, 2-methyl-N-(2,2,6,6-tetramethyl-4-piperidinyl)-2-[(2,2,6,6-tetramethyl-4-piperidinyl)amino] (Sumisorb® TM-061)

oligomer of N-(2-hydroxyethyl)-2,2,6,6-tetramethyl-4-piperidinol and succinic acid (Tinuvin® 622)

poly[[6-[(1,1,3,3-tetramethylbutyl)amino]-s-triazine-2,4-diyl][2,2,6,6-tetramethyl-4-piperidinyl)imino]hexamethylene[(2,2,6,6-tetramethyl-4-piperidinyl)imino]](Chimassorb® 944)

poly[(6-morfoline-S-triazine-2.4-diyl)][(2.2.6.6-tetramethyl-4-piperidinyl)-imino]hexamethylene-[(2.2.6.6-tetramethyl-4-piperidinyl)-imino]] (Cyasorb® UV-3346)

poly[(6-morpholino-s-triazine-2.4-diyl)[1.2.2.6.6-pentamethyl-4-piperidyl)imino]-hexamethylene[(2,2,6,6 tetramethyl-4-piperidyl)imino]] (Cyasorb® UV-3529)

poly methylpropyl-3-oxy-[4(2.2.6.6-tetrametyl)-piperidinyl)]-siloxane (Uvasil®299)

copolymer of α-methylstyrene and n-(2.2.6.6-tetramethyl-piperidinyl)-4-maleimide and N-stearyl-maleimide (Lowilite® 62)

1,2,3,4-butane tetracarboxylic acid, polymer with ß, ß, ß', ß'-tetramethyl-2,4,8,10-tetraoxaspiro[5,5]undecane-3,9-diethanol, 1,2,2,6,6-pentamethyl-4-piperidinyl ester (Mark® LA63)

1,2,3,4-butanetetracarboxylic acid, polymer with ß, ß, ß', ß'-tetramethyl-2,4,8,10-tetraoxaspiro[5,5]undecane-3,9-diethanol, 2,2,6,6-tetramethyl-4-piperidinyl ester (Mark® LA68)

oligomer of 7-Oxa-3,20-diazadispiro[5,1,11,2]heneicosan-21-one,2,2,4,4-tetramethyl-20-(oxiranylmethyl) (Hostavin® N30)

1,3,5-Triazine-2,4,6-triamine, N,N'''-[1,2-ethanediylbis [[[4,6-bis[butyl(1,2,2,6,6-pentamethyl-4-iperidinyl)amino]-1,3,5-triazine-2-yl]imino]-3,1-propanediyl]]-bis[N'.N''-dibutyl-N'.N'''-bis(1.2.2.6.6-pentamethyl-4-piperidinyl) (Chimassorb®119)

1.3-Propanediamine, N,N-1,2-ethanediylbis-,polymer with 2,4,6-trichloro-1,3,5-triazine, reaction products with N-butyl-2,2,6,6-tetramethyl-4-piperidinamine (Uvasorb® HA88)

1.6-Hexanediamine, N, N'-bis(2,2,6,6-tetramethyl-4 piperidinyl)-polymer with 2,4,6-trichloro-1,3,5-triazine, reaction products with N-butyl-1-butanamine and N-butyl-2,2,6,6-tetramethyl-4-piperidinamine (Chimassorb® 2020)

2,9,11,13,15,22,24,26,27,28-Decaazatricyclo[21,3,1,110,14]octacosa-1(27),10,12,14(28),23,25-hexaene-12,25-diamine,N,N'-bis(1,1,3,3-tetramethylbutyl)-2,9,15,22-tetrakis(2,2,6,6-pentamethyl-4-piperidinyl)-(Chimassorb® 966)

1,1',1''-(1,3,5-Triazine-2,4,6-triyltris ((cyclohexylimino)-2,1-ethanediyl)tris(3,3,5,5-tetramethylpiperazinone) (Goodrite® 3150)

1,1',1''-(1,3,5-Triazine-2,4,6-triyltris((cyclohexylimino)-2,1-ethanediyl)tris(3,3,4,5,5-tetramethylpiperazinone) (Goodrite® 3159)

1,6-hexanediamine, N,N'-bis(2,2,6,6-tetramethyl-4-piperidinyl)-, polymer with 2,4,6-trichloro-1,3,5-triazine, reaction products with 3-bromo-1-propene, n-butyl-1-butanamine and N-butyl-2,2,6,6-tetramethyl-4-piperidinamine, oxidised, hydrogenated (Tinuvin® NOR 371)

Alkenes, $C_{20-24}$ alpha-, polymers with maleic anhydride, reaction products with 2,2,6,6-tetramethyl-4-piperidinamine (Uvinul® 5050H)

N-2,2,6,6-tetramethyl-4-piperidinyl-N-amino-oxamide;
4-acryloyloxy-1,2,2,6,6-pentamethyl-4-piperidine;
HALS PB-41 (Clariant Huningue S. A.).

In a preferred embodiment, E2 is chosen from the list above and E1 is chosen from:

Benzenepropanoic acid, 3,5-bis(1,1-dimethylethyl)-4-hydroxy-octadecyl ester 2,5,7,8-Tetra-methyl-2-(4',8',12'-tri-methyl-tri-decyl)-chroman-6-ol N,N'—Hexamethylene bis (3,5-di-t-butyl-4-hydroxyhydrocinnamamide)

Ethylenebis (oxyethylene) bis (3-t-butyl-4-hydroxy-5-methylhydrocinnamate)

Hexamethylenebis (3,5-di-t-butyl-4-hydroxycinnamate)

Phenol, 4,4'4'''-[(2,4,6-trimethyl-1,3,5-benzenetriyl)-tris-(methylene)]-tris-2,6-bis(1,1-dimethylethyl)-

Bis-[3,3-bis-(4'-hydroxy-3'-t-butylphenyl butanoic acid]-glycol ester

Tris(3,5-di-t-butyl-4-hydroxy benzyl) isocyanurate

Tetrakis [methylene (3,5-di-t-butyl-4-hydroxyhydrocinnamate)] methane 3-(3,5-Di-t-butyl-4-hydroxy-phenyl) propion acid ester with 1,3,5-tris (2-hydroxy-ethyl)-iso-cyanurate.

Branching Agent

The composition according to the invention comprises a branching agent in an amount ranging from 0.01 to 6.0 wt % relative to the total composition, preferably from 0.03 to 3 wt %, and most preferred from 0.06 to 1.5 wt %.

Suitable branching agents that can be used in the composition of the container according to the invention are branching agents that have functional groups that can react with amino, amide and/or carboxylic end-groups in the polyamide. Preferably, the branching agent comprises functional groups chosen from the group of carboxylic acids and carboxylic acid anhydrides, or derivatives thereof, and epoxies. The advantage of these groups is that these can react with the functional groups in the polyamide during melt-processing of the composition in regular compounding processes in an extruder. Examples of suitable branching agents are oligomers and polymers comprising monomers having said functional groups.

More preferably the branching agent comprises a copolymer of at least an unsaturated dicarboxylic acid or a derivative thereof and a vinyl aromatic monomer. At least is here understood to mean that the copolymer may also contain a minor amount of one or more other monomers. The advantage is that the branching agent can be prepared by easy processes and from cheap raw materials, and that the effect of the copolymer when used as a branching agent can be controlled by the composition of the copolymer.

Examples of suitable unsaturated dicarboxylic acids or derivatives thereof that can be used as monomer for the copolymer are maleic acid or itaconic acid, or derivatives thereof, for example maleic anhydride (MA), N-phenyl maleinimide or itaconic anhydride. Dicarboxylic acid derivatives are here understood to be in particular anhydride or imide derivatives.

Examples of suitable vinyl aromatic monomers are styrene, or styrenics in which the aromatic ring contains a halogen or alkyl substituent. Preferably, however, is a copolymer of maleic anhydride and styrene (SMA). The MA content of the copolymer generally ranges from 5 to 40 wt %, preferably ranges from 10 to 35 wt % with respect to the copolymer. The advantage of a MA content above 10 weight % is that a higher degree of branching can be achieved through reaction with the polyamide. The advantage of a MA content below 35 weight % is that the risk of gel formation is reduced. More preferably the MA content ranges from 20 to 30 weight %. With these ranges the above mentioned advantages are further increased.

Preferably, the branching agent comprises (a) a copolymer of at least an unsaturated dicarboxylic acid or a derivative thereof and a vinylaromatic monomer, preferably styrene maleic anhydride copolymer (SMA), and (b) a copolymer of acrylonitrile and a vinylaromatic monomer, preferably styrene-acrylonitrile copolymer (SAN) wherein (a) and (b) are miscible and the ratio (a)/(b) is between 1/3 to 3/1. The advantage is that such a branching agent gives less gel formation and yields more homogeneous properties.

Even more preferably, the branching agent comprises
(a) 5-75 weight % of the copolymer of at least an unsaturated dicarboxylic acid or a derivative thereof and a vinyl aromatic monomer;
(b) 5-75 weight % of a copolymer of acrylonitrile and a vinyl aromatic monomer; and
(c) 0-80 weight % of an inert processing aid;
in which (a) and (b) are miscible and the ratio (a)/(b) is from 1/3 to 3/1 and weight % is with respect to the total amount of branching agent.

The advantage of this branching agent is a much better reproducibility when preparing a polyamide composition with non-Newtonian melt flow behaviour and a much more accurate control of the viscosity, while in addition hardly any problems are caused by formation of gel particles. A further advantage is that a high MA content can be used without occurring of any undesirable crosslinking and formation of insoluble particles (gel particles). Another advantage is that larger amounts of branching agent can be added, so that there are fewer dosing problems in the production of a composition.

Suitable vinyl aromatic monomers in component (b) are the same as described for the copolymer (a), with (b) preferably being a copolymer of styrene and acrylonitrile (SAN). The acrylonitrile (AN) content of (b) generally ranges from 5 to 40 wt %, preferably from 10 to 35 wt %, and more preferably from 20 to 30 wt %. The advantage of a higher AN content is a higher polarity of the copolymer, which improves the compatibility with polyamides.

As a rule, an SMA copolymer is miscible with a SAN copolymer if the ratio between the MA content and the AN content, thus MA content/AN content, of the respective copolymers is roughly between 1.6 and 0.6. Preferably the branching agent therefore contains SMA and SAN copolymers with a ratio between the MA content and the AN content of between 1.6 and 0.6, more preferably between 1.2 and 0.8.

The ratio between the amounts of components (a) and (b) may in principle vary between 3/1 and 1/3. Preferably the (a)/(b) ratio lies between 2/1 and 1/2. This has the advantage that a better dispersion of the branching agent is obtained.

In an even more preferred embodiment of the invention, the branching agent contains 10-80 weight % of an inert processing aid. A thermoplastic polymer is an example of a suitable inert processing aid. This has the advantage that dosing of the branching agent is greatly improved and can be controlled much more accurately. This inert processing aid also serves as carrier material for the preparation of a branching agent in the form of a SMA and SAN concentrate. Inert is understood to mean that the processing aid or the carrier material does not react with the other components (a) and (b) and with amine groups of the polyamide to which the branching agent is later added, and neither does it interfere to any undesirable extent with the reaction between anhydride groups and amine groups. The inert processing aid is preferably a thermoplastic polyolefin. This is understood to be a polymer or copolymer of substantially at least one olefin, which may also incorporate minor amounts of other monomers. Suitable examples include various types of polyethylene, including low- and high-density polyethylene (LDPE, HDPE), ethylene/α-olefin copolymers such as plastomers, ethylene copolymers with a vinyl monomer or an alkyl(meth)acrylate, such as for example vinyl acetate or ethyl acrylate, and propylene homopolymer and copolymers. The branching agent preferably contains an LDPE as inert processing aid in view of its good processability. In a special embodiment the branching agent contains between 40 and 80 weight % of an inert processing aid.

Higher amounts of branching agent is preferred when an SMA with a low anhydride group content is used and a lower amounts are preferred when an SMA with a high anhydride content is used. A larger amount of branching agent and/or a higher anhydride groups content in the branching agent generally results in a stronger increase in the viscosity and more pronounced non-Newtonian melt flow behaviour of the composition.

Preferably, the composition according to the invention may comprise a silicone oil, as this has the advantage of increasing the processing window even further. Suitable silicone oils are polymerized siloxanes with organic side chains, and include for example polydimethylsiloxane (PDMS). More preferably, the kinematic viscosity of the silicone oils is ranging from 50 cSt (centiStokes) to 12500 cSt. Preferably, the amount of silicone oil is at least 50 ppm with respect to the total composition, more preferably at least 75 ppm, and most preferred at least 100 ppm. Preferably, the composition comprises at most 1000 ppm, more preferably at most 800 ppm and most preferred at most 500 ppm.

The composition according to the invention may also comprise reinforcing fibers, such as glass or carbon fibers, or mineral fillers, such as for example wollastonite.

The composition according to the invention preferably comprises a nucleating agent. More preferably, the nucleating agent is micro talcum.

Micro talcum may be present in the composition in very low amounts, such as in an amount of at least 0.001 wt % with respect to the total amount of the polymer composition, preferably at least 0.01 wt %, more preferably at least 0.02 wt %, even more preferably at least 0.04 wt %. Preferably, micro talcum may be present in the polymer composition in an amount of at most 1 wt % with respect to the total amount of the composition, more preferably at most 0.5 wt % and even more preferred at most 0.2 wt %.

Presence of micro talcum in a blow molded container according to the invention has the advantage that it improves the barrier performance against hydrocarbon fuels.

Applications

The composition according to the invention typically can be employed to produce blow molded parts, such as for example containers, also known as canisters, including fuel container, compressed natural gas (CNG) tanks, hydrogen tanks, ducts, including air ducts, chemical storage containers.

The composition according to the invention is particularly suitable for preparing a blow molded container, having a length L, a width W and a depth D as defined in a 3 dimensional Cartesian coordinate system, wherein L is at least 75 cm, and in which L>2W≥D. The length is defined as the largest dimension compared to the width and depth. The width is defined as the largest dimension in a plane perpendicular to the length. The width and the depth may differ, such as in a rectangular shape. The width and the depth may be the same such as in for example a cylindrical shape.

Preferably width and depth are the same, as this allows for more homogeneous stress distribution. Preferably L is at least 100 cm, more preferably at least 150 cm and most preferred at least 250 cm. Preferably, the blow molded container has L>3W≥D, more preferred L>4W≥D, and most preferred L>5W≥D. The volume of the blow molded container according to the invention is preferably at least 40 liters, more preferably at least 70 liters and even more preferred at least 120 liters, and most preferred at least 250 liters. The volume of a container may be as high as 2500 liters.

Preferably, the blow molded container has a weight of at least 3 kg, more preferably the weight is at least 4 kg and most preferred at least 5 kg. The blow molded containers according to the invention may have a weight as high as 75 kg.

In a preferred embodiment, the blow molded container has an L of at least 100 cm and L>3W≥D. In a more preferred embodiment the blow molded container has an L of at least 250 cm and L>5W≥D.

The blow molded container may be part of a tank and may be wrapped with for example fiber reinforced thermoset or thermoplast in order to provide higher strength.

Preferably, the average wall thickness of the blow molded container is at least 0.8 mm in order to provide sufficient strength. More preferably, the average wall thickness is at least 1.0 mm, even more preferred at least 1.5 mm. Wall thicknesses of 3, 4, 5 and 6 mm can be prepared, depending on the desired application.

Usually, the blow molded containers have at least one opening which is parallel to the extrusion direction of the parison. The blow molded containers preferably have a cylindrical shape, as this allows for more homogenous wall thickness distribution.

The compositions according to the invention when blow molded into a container, show an energy of at least 30 J at an impact falling dart test, as described below. Surprisingly, after heat aging at for example 200° C. during extended time, such as after 20 min, 200 min, 500 min and even 1000 min, the energy remains sufficient for the impact falling dart test, such as at least 30 J, preferably at least 35 J.

Process for Preparing a Container

Blow-molding is here understood to comprise at least the following steps:
a. heating the composition as described above to obtain a viscous liquid;
b. forming a parison from the viscous liquid;
c. expand the parison by pressurized gas and press it against a mold cavity until it cools and solidifies to form a container;
d. opening the mold;
e. ejecting the container.

The invention also relates to a process for preparing a blow molded container employing the polyamide composition according to the invention as described above. The process according to the invention allows for a higher processing window.

Examples

Melt Volume Flow Rate (MVR)

The MVR of the composition was measured according to ISO 1133 with a weight of 21.6 kg and at 275° C. prior to blow molding.

Impact Falling Dart Test

Impact falling dart test at −40° C. was performed on the plates using the guidelines ISO 6603-2. The diameter of the spherical falling dart was 20 mm and the mass of the falling dart was 23 kg. The test speed was 4.4 m/sec. At least five plates were tested. Plates of each material had been placed in a −40° C. freezer overnight prior to testing.

Compositions were prepared by melt-mixing the ingredients as provided in Table 1 and 2; wt % are given for the compositions. These compositions were injection molded into test plates and exposed to 200° C. for a specified time. Plates from table 1 were exposed to 200° C. during 20 min, 200 min, 500 min and 1000 min respectively. Plates from table 2 were exposed to 200° C. during 200 min. After the specified exposure the plates were cooled and impact falling dart test was performed as specified above. Results are given in Table 1 and 2 as well.

The results of table 1 clearly indicate that a composition comprising a semi-crystalline polyamide and an impact modifier and a branching agent and an inorganic stabilizer and organic stabilizer comprising a hindered phenolic antioxidant group and a hindered amine group, shows a synergistic effect. Example 1 shows high energy values for the falling dart test even after exposure of 1000 minutes at 200° C. In compositions were no organic stabilizer is present (Comparative B) or only one organic stabilizer (Comparative A) the energy values for the falling dart test decreased within 200 minutes. Also in the case where no inorganic stabilizer was present (Comparative C) or for a composition in which no impact modifier was present (Comparative D), the energy values for the falling weight test were insufficient. This clearly demonstrates that the composition which comprises an impact modifier, a branching agent and an inorganic stabilizer and an organic stabilizer based on both primary antioxidant and hindered amine show an synergistic effect in providing improved heat resistance, as measured by a falling weight test at 200° C.

TABLE 1

|  |  | Ex 1 | Comp A | Comp B | Comp C | Comp D |
|---|---|---|---|---|---|---|
| Polymer | PA6 | 75.56 | 76.21 | 76.54 | 76.04 | 98.55 |
| Impact modifier | MAH grafted rubber | 22.79 | 22.79 | 22.79 | 22.79 |  |
| Inorganic stabilizer | CuI/KBr | 0.16 | 0.16 | 0.16 |  | 0.16 |
| Branching Agent | SMA/SAN/LDPE; 23.2/23.2/53.6 [wt %] | 0.42 | 0.43 | 0.43 | 0.43 | 0.55 |
| Nucleating agent | microtalcum | 0.08 | 0.08 | 0.08 | 0.08 | 0.08 |
| Organic stabilizer | PAO; Irganox 1098 | 0.33 |  |  | 0.33 | 0.33 |
| Organic stabilizer | HAS; Hostavin N30 | 0.66 | 0.33 |  | 0.33 | 0.33 |
| Total Energy −40° C. falling weight test; [J]; 0 min |  | 37 | 38 | 37 | 39 | 18 |
| 20 min @ 200° C. |  | 55 | 53 | 49.8 | 57 | 12.6 |
| 200 min @ 200° C. |  | 56 | 1 | 1.1 | 55 | 0.7 |
| 500 min @ 200° C. |  | 46 | 1.8 | 1 | 1.1 | 0.9 |
| 1000 min @ 200° C. |  | 38 | 2.3 | 4.3 | 3.2 | 2.2 |

TABLE 2

|  |  | Ex 2 | Ex 3 | Ex 4 | Ex 5 | Ex 6 | Ex 7 | Ex 8 | Ex 9 |
|---|---|---|---|---|---|---|---|---|---|
| Polymer | PA6 | 75.97 | 75.97 | 75.97 | 75.97 | 75.97 | 76.42 | 76.47 | 76.32 |
| Impact modifier | MAH grafted rubber | 22.79 | 22.79 | 22.79 | 22.79 | 22.79 | 22.34 | 22.22 | 22.22 |
| Inorganic stabilizer | CuI/KBr | 0.07 | 0.07 | 0.07 | 0.07 | 0.07 | 0.08 | 0.15 | 0.30 |
| Branching Agent | SMA/SAN/LDPE; 23.2/23.2/53.6 [wt %] | 0.43 | 0.43 | 0.43 | 0.43 | 0.43 | 0.42 | 0.42 | 0.42 |
| Nucleating agent | microtalcum | 0.08 | 0.08 | 0.08 | 0.08 | 0.08 | 0.08 | 0.08 | 0.08 |
| Organic stabilizer | PAO; Irganox 1098 | 0.33 | 0.33 | 0.33 |  |  | 0.33 | 0.33 | 0.33 |
| Organic stabilizer | PAO; Irganox 1010 |  |  |  | 0.33 | 0.33 |  |  |  |
| Organic stabilizer | HAS; Chimasorb 944 | 0.33 |  |  |  |  | 0.33 | 0.33 | 0.33 |
| Organic stabilizer | HAS; Hostavin N30 |  | 0.33 |  | 0.33 |  |  |  |  |
| Organic stabilizer | HAS; ADK STAB LA-63 |  |  | 0.33 |  | 0.33 |  |  |  |
| Total Energy −40° C. falling weight test [J] 200 min @ |  |  |  |  |  |  |  |  |  |
| 200° C. |  | 57 | 56.2 | 57.8 | 58.4 | 56 | 43 | 46 | 45 |

TABLE 3

|  |  | Ex 10 | Ex 11 | Ex 12 | Ex 13 | Ex 14 | Ex 15 | Ex 16 | Ex 17 | Ex 18 |
|---|---|---|---|---|---|---|---|---|---|---|
| Polymer | PA6 | 75.89 | 75.56 | 75.40 | 74.90 | 75.89 | 75.89 | 75.90 | 63.59 | 63.59 |
| Impact modifier | MAH grafted rubber | 22.79 | 22.79 | 22.79 | 22.79 | 22.79 | 22.79 | 22.79 | 34.82 | 34.82 |
| Inorganic stabilizer | CuI/KBr | 0.16 | 0.16 | 0.32 | 0.16 | 0.16 | 0.16 |  | 0.16 | 0.16 |
|  | Bruggolen H3387; copper based antioxidant |  |  |  |  |  |  | 0.15 |  |  |
| Branching Agent | SMA/SAN/LDPE; 23.2/23.2/53.6 [wt %] | 0.43 | 0.42 | 0.42 | 0.42 | 0.43 | 0.43 | 0.43 | 0.36 | 0.36 |
| Nucleating agent | microtalcum | 0.08 | 0.08 | 0.08 | 0.08 | 0.08 | 0.08 | 0.08 | 0.08 | 0.08 |
| Organic stabilizer | PAO; Irganox 1098 | 0.33 | 0.66 | 0.66 | 1.32 |  | 0.17 | 0.33 | 0.66 | 0.33 |
| Organic stabilizer | PAO; Irganox 1076 |  |  |  |  | 0.33 | 0.17 |  |  | 0.33 |
| Organic stabilizer | HAS; Hostavin N30 | 0.33 | 0.33 | 0.33 | 0.33 | 0.33 | 0.33 | 0.33 | 0.33 | 0.33 |
| Total Energy −40° C. falling weight test [J] |  |  |  |  |  |  |  |  |  |  |
| 200 min @ 200° C. |  | 59 | 59 | 58 | 61 | 58 | 58 | 58 | 50 | 51 |
| 500 min @ 200° C. |  | 60 | 60 | 58 | 51 | 57 | 59 | 58 | 54 | 54 |

The results of Table 2 show that a combination with a semi-crystalline polyamide, an impact modifier, a branching agent and an inorganic stabilizer and a variety of organic stabilizers comprising primary antioxidant groups in combination with a variety of organic stabilizers comprising hindered amine groups also show a synergistic effect by providing high energy values for the falling dart test after being exposed for 200 minutes at 200° C.

The compositions of examples 7 and 8 were blow molded into tanks. The MVR of these compositions were 36 cm³/10 min and 38 cm³/10 min respectively. The blow molded tanks were cut open and pinch lines were visually inspected. Sharp V-shape dents are an example of a bad pinch line quality. Good pinch lines show a smooth dent. The tanks of both example 7 and 8 showed a smooth dent and thus a good pinch line. Surprisingly, the inside of the tanks also exhibited less oxidation.

The compositions in Table 3, all according to the invention, clearly show that with varying amounts of impact modifier (examples 17 and 18), or with other inorganic stabilizer (example 16) or with other organic stabilizer (examples 14 and 15), as well with varying amounts of stabilizers, all compositions exhibited a sufficient total energy of the falling dart test, even after exposure to 200° C. for 500 minutes.

The invention claimed is:

1. A polyamide composition comprising:
   (a) a semi-crystalline aliphatic polyamide selected from the group consisting of PA-6, PA-66, PA6/66, PA66/6, PA-410 and blends thereof;
   (b) 5 to 50 wt. % of functionalized olefinic rubber having a Tg of lower than 0° C. and containing groups reactive with the polyamide (a) as an impact modifier;
   (c) 0.03 to 3.0 wt. % of a branching agent having functional groups that are capable of reacting with amino, amide and/or carboxylic end-groups of the polyamide (a);
   (d) 0.01 to 2.0 wt. % of a copper compound and a salt containing a halogenide acid group or a copper complex as an inorganic stabilizer; and
   (e) a combination of an organic stabilizer E1 in an amount ranging from 0.1 wt % to 2.0 wt % and an organic stabilizer E2 in an amount ranging from 0.1 wt % to 2.0 wt %; wherein
   the organic stabilizer E1 comprises a primary antioxidant group which is a phenolic antioxidant, and the organic stabilizer E2 comprises a hindered amine group derived from a substituted piperidine compound, and wherein
   all wt % are based on the total amount of polyamide composition, and wherein
   a blow molded part formed of the polyamide composition after heat aging at 200° C. exhibits at least 30 J of energy by an impact falling dart test according to ISO 6603-2 after 20 minutes, 200 minutes and 1000 minutes.

2. The polyamide composition according to claim 1, wherein the polyamide composition has a melt volume flow rate ranging from 25 to 45 cm³/10 min, as measured according to ISO 1133 with 21.6 kg and 275° C.

3. The polyamide composition according to claim 1, wherein
   E1 is present in an amount ranging from 0.1 wt % to 1.0 wt % and E2 is present in an amount ranging from 0.1 wt % to 2.0 wt %, or
   E3 is present in an amount ranging from 0.2 to 3.0 wt %, or a combination of E1, E2 and E3 is present in a total amount ranging from 0.2 to 0 wt %.

4. The polyamide composition according to claim 1, wherein E1 is selected chosen from the group consisting of:
   benzenpropanoic acid, 3,5-bis(1,1-dimethylethyl)-4-hydroxy-octadecyl ester;
   2,5,7,8-Tetra-methyl-2-(4',8',12'-tri-methyl-tri-decyl)-chroman-6-ol;
   N,N"-hexamethylene bis (3,5-di-t-butyl-4-hydroxyhydro-cinnamamide); ethylenebis(oxyethylene) bis (3-t-butyl-4-hydroxy-5-methylhydrocinnamate);
   hexamethylenebis (3,5-di-t-butyl-4-hydroxycinnamate);
   4,4',4"-[(2,4,6-trimethyl-1,3,5-benzenetriyl)tris(methylene)]tris[2,6-bis(1,1-dimethylethyl)-phenol;
   bis-[3,3-bis-(4"-hydroxy-3"-t-butylphenyl butanoic acid]-glycol ester:
   tris(3,5-di-t-butyl-4-hydroxy benzyl) isocyanurate;
   tetrakis[methylene (3,5-di-t-butyl-4-hydroxyhydrocinnamate)] methane; and
   3-(3,5-di-tert-butyl-4-hydroxyphenyl)propionic acid ester with 1,3,5-tris (2-hydroxy-ethyl)-iso-cyanurate.

5. The polyamide composition according to claim 1, wherein a ratio E1:E2 is at least 1:1.5, wherein the ratio is based on weight percentages of total weights of E1 and E2.

6. The polyamide composition according to claim 1, wherein the composition is free of phosphites.

7. The polyamide composition according to claim 1, wherein E1 is a hindered phenolic antioxidant.

8. The polyamide composition according to claim 1, wherein the composition further comprises a silicone oil in an amount of at least 50 ppm with respect to the total amount of composition.

9. The polyamide composition according to claim 1, wherein the composition further comprises a nucleating agent.

10. A blow molded container prepared by blow molding a polyamide composition according to claim 1, wherein after heat aging at 200° C., the blow molded container exhibits at least 30 J of energy by an impact falling dart test according to ISO 6603-2 after 20 minutes, 200 minutes and 1000 minutes.

11. The blow molded container according to claim 10, wherein the container has a length L, a width W and a depth D as defined in a 3 dimensional Cartesian coordinate system, wherein L is at least 75 cm, and in which L>2W≥D.

12. The blow molded container according to claim 10, wherein the container is in a form selected from the group consisting of fuel tanks, compressed natural gas tanks, hydrogen tanks, ducts and chemical storage containers.

13. A polyamide composition comprising:
    (a) a semi-crystalline aliphatic polyamide selected from the group consisting of PA-6, PA-66, PA6/66, PA66/6, PA-410 and blends thereof;
    (b) 5 to 50 wt. % of functionalized olefinic rubber having a Tg of lower than 0° C. and containing groups reactive with the polyamide (a) as an impact modifier;
    (c) 0.03 to 3.0 wt. % of a branching agent having functional groups that are capable of reacting with amino, amide and/or carboxylic end-groups of the polyamide (a);
    (d) 0.01 to 2.0 wt. % of copper iodide and potassium bromide as inorganic stabilizers; and
    (e) a combination of an organic stabilizer E1 in an amount ranging from 0.1 wt % to 2.0 wt % and an organic stabilizer E2 in an amount ranging from 0.1 wt % to 2.0 wt %; wherein
    the organic stabilizer E1 comprises a primary antioxidant group which is a phenolic antioxidant, and wherein
    the organic stabilizer E2 comprises a hindered amine group derived from a substituted piperidine compound, and wherein
    all wt % are based on the total amount of polyamide composition, and wherein
    a blow molded part formed of the polyamide composition after heat aging at 200° C. exhibits at least 30 J of energy by an impact falling dart test according to ISO 6603-2 after 20 minutes, 200 minutes and 1000 minutes.

14. The polyamide composition according to claim 13, wherein the organic stabilizer E1 is present in an amount from 0.1 to 1.0 wt. %.

* * * * *